Figures 1, 2:
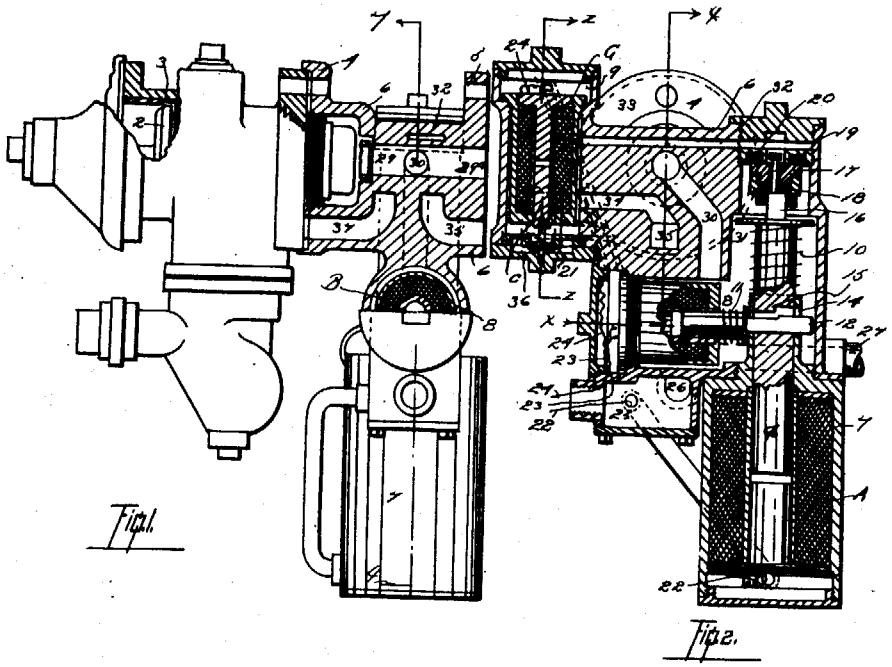

15

E. R. HUMPHREY.

ELECTROMAGNETIC AIR BRAKE.

APPLICATION FILED NOV. 12, 1917.

Reissued Nov. 26, 1918.

Re 14,555.

2 SHEETS—SHEET 1.

INVENTOR
E. R. HUMPHREY.

BY Fatherstonhaugh & Co.

ATTY'S.

THE NORRIS PETERS CO., PHOTO-LITHO., WASHINGTON, D. C.

DRAFTSMAN
15
E. R. HUMPHREY.
ELECTROMAGNETIC AIR BRAKE.
APPLICATION FILED NOV. 12, 1917.
Reissued Nov. 26, 1918.
14,555.
2 SHEETS—SHEET 2.
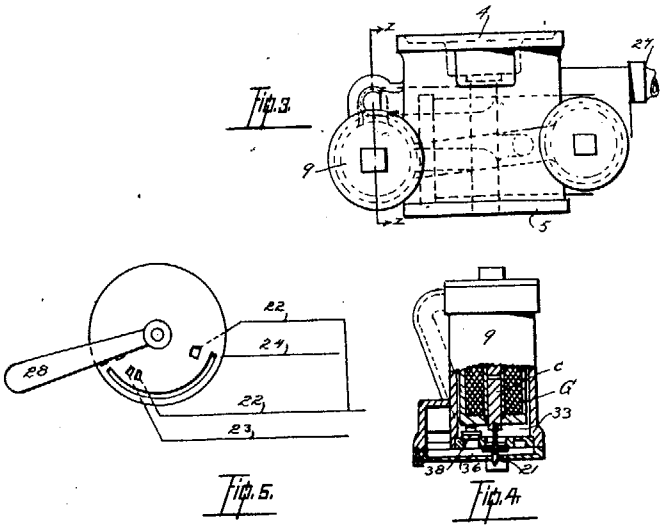
INVENTOR
E. R. HUMPHREY
BY
Fetherstonhaugh & Co.
ATTY'S.
THE HOBBS PETERS CO., PHOTO-LITHO., WASHINGTON, D. C.

UNITED STATES PATENT OFFICE.

EDWARD R. HUMPHREY, OF VICTORIA, BRITISH COLUMBIA, CANADA, ASSIGNOR TO SAFETY FIRST AIR BRAKE COMPANY (CANADA) LIMITED, OF VICTORIA, BRITISH COLUMBIA, CANADA.

ELECTROMAGNETIC AIR-BRAKE.

14,555. Specification of Reissued Letters Patent. Reissued Nov. 26, 1918.

Original No. 1,200,444, dated October 3, 1916, Serial No. 45,478, filed August 14, 1915. Application for reissue filed November 12, 1917. Serial No. 201,700.

*To all whom it may concern:*

Be it known that I, EDWARD R. HUMPHREY, a subject of Great Britain, and a resident of Victoria, in the Province of British Columbia, Dominion of Canada, have invented certain new and useful Improvements in Electromagnetic Air-Brakes, of which the following is a full, true, and exact specification.

My invention relates to improvements in automatic air brakes and has for its principal object to generally improve upon my previous application No. 863,066, filed September 23rd, 1914, in that the electrically operating mechanism is made in the form of a separate unit which may be used in connection with a Westinghouse or New York air operated triple valve; to provide electrically operated means for applying the brakes in either a service or an emergency position without moving the triple valve of the system from release position; and to provide means for charging the auxiliary cylinder with the brakes in holding position.

A further object is to apply all brakes of a train simultaneously by a direct acting magnetically actuated valve.

In my former application referred to above, the differential pressure and differential magnetic action was relied upon to actuate the valves whereas I now actuate them by a direct magnetic pull which has proved superior in actual service tests because of the more positive action. The brake cylinder, compressor, air retainer, tanks, train pipe, connections, etc., which are not here shown are the same in the system of which my device is a part as in the well known Westinghouse system. In fact the triple valve here shown is a well known type of Westinghouse triple.

Other objects will appear as my invention is more fully described in the following specification, illustrated in the accompanying drawings and pointed out in the appended claims.

Figure 1 is a side elevation, with parts broken away of a Westinghouse triple valve with my device shown attached thereto and being shown as a part side elevation and part section on line *x—x* of Fig. 2. Fig. 2 is a section on line *y—y* of Fig. 1 showing my device only. Fig. 3 is a plan of my device. Fig. 4 is a part section on line *z—z* of Figs. 2 and 3. Fig. 5 is a diagrammatic plan of an engineer's switch for applying the brakes electrically.

Referring more particularly to the drawings, numeral 1 indicates a Westinghouse triple valve having the usual piston 2 and feed groove 3, this valve being shown in release position. All of the above is usual.

My device is provided with flanges 4 and 5 of similar size and boltings to the usual end flange of the triple valve body 1 so as to enable my device to be bolted at one end directly to said triple valve.

My device includes a body casting 6 having magnet casings 7, 8 and 9 for housing application, pawl, and release magnets A, B and C, respectively. The detail construction of the said magnets A, B and C will not be described except to say that they are coils wound upon spools and having movable cores *a*, *b* and *c* respectively. Springs 10 and 11 hold cores *a* and *b* respectively in an extended position while core *c* is similarly held by gravity. Pawl magnet B is arranged at right angles to application magnet A and is designed to operate a pawl 12 having a step 13. The pawl 12 projects through an opening 14 in core *a* which also has a step 15.

The function of the pawl is to regulate the vertical travel of core *a* so as to prevent the complete closing of the air gap in the magnet in a service application and to reduce the travel of the said core in service application. When in service position, the core *b* is drawn into magnet B until the step 13 is to the left of step 15, thereby reducing the possible travel of core *a*, which is the only function of magnet B. The upper end of core *a* is provided with piston valves 16 and 17 for service and emergency applications respectively. In a service application, the travel of the core *a* is only sufficient to unseat the valve 16 with respect to seat 18, thus allowing the air to pass said valve around a stem 19. In an emergency application, the travel of core *a* is sufficient to bring the head of stem 19 into contact with valve 17 and to unseat said valve from its seat 20 which presents a larger opening and allows the air to pass valve 17 directly.

Core *c* of magnet C is secured to release valve 21 which is normally open and is closed only when magnet C is energized. All magnets are grounded to the body and have separate circuits 22, 23 and 24 from magnets A, B and C respectively, which pass through conduits into a connection box 25 from which they may leave the casing to the left as shown in Fig. 2 or to the right through passage 26 and conduit 27 to the main train wires which lead through sources of current (not shown) to an engineer's switch as shown in Fig. 5. The wires are given the same numbers as in Fig. 2. The moving of the engineer's switch 28 from release position as shown to the right first closes the circuit to magnet C and thus closes the release valve 21. A further movement into service position first closes the circuit 23 to magnet B which pulls the pawl 12 into a position to limit the travel of core *a*. Almost instantly the circuit 22 to the magnet A is closed also, thus opening the service valve 16 and this latter position constitutes a service application. To effect an emergency application, the switch 28 is still further thrown to the right, first releasing the magnets A and B and then finally closing the circuit 22 to the magnet A which pulls the core *a* to its extreme position and opens emergency valve 17. The air passages and connections of my device will now be explained.

The air enters the Westinghouse triple in the usual way; passes piston 2 by way of groove 3 and after passing through the triple valve, enters passage 29 of my device, thence through passage 30 into a chamber 31 beneath valves 16 and 17. When either of said valves are opened, the air after passing through follows passage 32 into a chamber 33 and around magnet C, through passage 34 and out of port 35 to the brake cylinder not shown. The air in charging the auxiliary tank (not shown) after passing into passage 29 leaves the device by the right hand end 29[a] of said passage directly into the tank and is drawn off from the tank through the same passage from which it enters passage 30.

In releasing the brakes, the air is vented back through port 35, passage 34, past valve 21 into passage 36, beneath said valve and through passage 37 into the triple outlet which is open because the triple is still at release position, it being understood that the making of application by electricity does not move the triple from release position. When it is desired to make an application by use of the triple valve, its operation is as usual, the air leaving the triple by way of passage 37 into passage 36, up through a valve 38, into chamber 33, through passage 34 and port 35. The auxiliary tank is charged the same time in either case of application. The venting or release takes place through the same passages as in the electrical operation. It will be seen that when the applications are made electrically, the auxiliary tank is being charged at all times.

While I have shown a particular form of embodiment of my invention, I am aware that many minor changes therein will readily suggest themselves to others skilled in the art without departing from the spirit and scope of the invention, and I therefore desire to avoid being limited to the exact form shown and described except as pointed out in the appended claims.

Having described my invention, what I claim as new and desire to protect by Letters Patent, is:—

1. In a device of the class described, the combination with an air brake system for trains which includes triple valves, of electrically operated means removably attachable to said triple valve, for applying and releasing the said air brakes with the said triple valve remaining in release position, said means including valves directly connected to magnetic solenoid operating means, one of said solenoids operating both service and emergency valves, and a magnetically operated pawl whereby the making of either a service or an emergency application is automatically controlled.

2. In a device of the class described, the combination with an air brake system for trains which includes triple valves, of electrically operated means removably attachable to said triple valves for applying and releasing the said air brakes with the said triple valve remaining in release position, said means including a common movable core solenoid magnet for operating both service and emergency valves, a similar magnet for operating a pawl which positively regulates the travel of first mentioned core in such a way as to selectively determine the extent of an air application, and a similar magnet which operates a release valve.

3. In a device of the class described, the combination with an air brake system for trains which includes triple valves, of an electrically operated means for making service and emergency applications and for releasing same independently of the said triple valves, said means including a common movable core solenoid magnet for operating both service and emergency valves, a similar magnet for operating a pawl which positively regulates the travel of first mentioned core in such a way as to selectively determine the extent of an air application, a similar magnet which operates a release

DRAFTSMAN valve, all of the above mentioned means being inclosed in a casing which is attachable to said triple valve of said system; air passages in said casing and connecting ports in the said triple valve with valve chambers adjacent the said service, emergency and release valves, whereby the operating fluid may pass through the said triple valve when in release position and maintain the auxiliary tank of the system charged while applications are being made or held by the said electrically operated means.

4. In an electromagnetic airbrake, a controlling device having a common port through which air may pass for both service and emergency application, and separate emergency and service control valves, controlling said port, and electromagnetic means for controlling said valves.

5. In an electromagnetic airbrake, an axially movable electromagnetically controlled member, carrying service and emergency valves adapted to be successively opened by movement of the member in a given direction.

6. In an electromagnetic airbrake, a controlling device having a port, an emergency valve normally covering a part of said port, and itself formed with a port, a service valve controlling the port in the emergency valve and electromagnetic means for controlling both of said valves.

7. In an electromagnetic airbrake, a controlling device, having a port, an emergency valve normally covering a part of said port and itself formed with a port, a service valve controlling the port in the emergency valve, and an axially movable electromagnetically controlled member adapted when moved in one direction to successively open said valves.

8. In an electromagnetic air brake, a controlling device having a port for the passage of air for service and emergency application, a service and an emergency valve both of the lifting type, and electromagnetic means for successively and directly operating the said valves.

9. In an electromagnetic air brake, a controlling device having a common passage for service and emergency air, service and emergency valves controlling said passage, both of the lifting type, and electromagnetic means for directly operating the said valves.

In witness whereof I have hereunto set my hand.

EDWARD R. HUMPHREY.

Copies of this patent may be obtained for five cents each, by addressing the "Commissioner of Patents, Washington, D. C."